(12) United States Patent
Kennedy et al.

(10) Patent No.: US 11,580,872 B2
(45) Date of Patent: Feb. 14, 2023

(54) EMBEDDED TRAINING FOR COMMERCIAL AVIATION

(71) Applicant: The Boeing Company, Chicago, IL (US)

(72) Inventors: Richard James Kennedy, Coslada (ES); Hans Nicklas Sigfrid Dahlstrom, Dubai (AE); Mark Richard Cameron, Dubai (AE)

(73) Assignee: The Boeing Company, Chicago, IL (US)

( * ) Notice: Subject to any disclaimer, the term of this patent is extended or adjusted under 35 U.S.C. 154(b) by 376 days.

(21) Appl. No.: 16/806,180

(22) Filed: Mar. 2, 2020

(65) Prior Publication Data

US 2021/0272469 A1 Sep. 2, 2021

(51) Int. Cl.
*G09B 9/08* (2006.01)
*G06Q 10/06* (2012.01)
*G06N 20/00* (2019.01)
*G06Q 10/0631* (2023.01)
*G06Q 10/0639* (2023.01)

(52) U.S. Cl.
CPC .............. *G09B 9/08* (2013.01); *G06N 20/00* (2019.01); *G06Q 10/06311* (2013.01); *G06Q 10/06398* (2013.01)

(58) Field of Classification Search
CPC .......... G09B 9/08; G09B 9/307; G09B 9/302; G09B 9/12; G09B 9/14; G09B 9/04; G09B 9/006; G09B 7/04; G09B 7/00; G09B 19/24; G09B 19/18; G09B 9/52; G09B 5/00; G09B 7/02; G09B 19/00; G09B 9/00; G06Q 10/06398; G06Q 50/2057; G06Q 10/063112; G06Q 50/205; G06Q 10/0639; G06Q 10/06311; G06Q 10/063116; G06Q 50/20
See application file for complete search history.

(56) References Cited

U.S. PATENT DOCUMENTS 5,270,920 A * 12/1993 Pearse .............. G06Q 10/06314
705/7.22
5,727,950 A * 3/1998 Cook ....................... G09B 5/14
434/350

(Continued)

OTHER PUBLICATIONS

Cox, John, Ask the Captain: What do pilots do during down time? USA Today, Feb. 18, 2013 (Year: 2013).*

(Continued)

*Primary Examiner* — Scott L Jarrett
(74) *Attorney, Agent, or Firm* — Parsons Behle & Latimer

(57) ABSTRACT

A learning management system may be configured to retrieve roster data from a roster database and determine from the roster data whether a pilot has a scheduled downtime during a flight or a layover time before the flight. The system may further retrieve flight data associated with the flight from the learning management system and determine a training concept associated with the flight. The system may also select a training exercise from multiple training exercises, where the training exercise is associated with the training concept. A notification may be sent to an electronic device associated with the pilot, where the notification includes an offer to perform the training exercise.

20 Claims, 5 Drawing Sheets

(56) References Cited

U.S. PATENT DOCUMENTS

| | | | | |
|---|---|---|---|---|
| 6,033,226 | A * | 3/2000 | Bullen | G09B 9/00 434/219 |
| 6,301,573 | B1 * | 10/2001 | McIlwaine | G09B 5/00 706/60 |
| 6,628,777 | B1 * | 9/2003 | McIllwaine | G06Q 10/06 379/265.06 |
| 6,871,195 | B2 * | 3/2005 | Ryan | G09B 7/02 434/118 |
| 7,024,154 | B1 * | 4/2006 | Koepper | G09B 5/00 434/350 |
| 8,079,066 | B1 * | 12/2011 | Cordell | G06Q 10/06311 713/153 |
| 8,488,769 | B1 * | 7/2013 | Noble, Jr. | H04M 3/5175 379/265.03 |
| 8,535,059 | B1 * | 9/2013 | Noble, Jr. | G09B 7/02 379/265.06 |
| 8,600,034 | B2 * | 12/2013 | Teitelman | H04M 3/5175 379/265.06 |
| 10,833,917 | B1 * | 11/2020 | McConnell | G06F 9/54 |
| 2002/0026537 | A1 * | 2/2002 | Schlabach | G06Q 10/06 710/1 |
| 2002/0077884 | A1 * | 6/2002 | Sketch | G06Q 10/10 705/12 |
| 2002/0102525 | A1 * | 8/2002 | Coppolino | G09B 5/00 434/350 |
| 2002/0123913 | A1 * | 9/2002 | Butterly | G06Q 10/025 705/6 |
| 2002/0133389 | A1 * | 9/2002 | Sinex | G06Q 10/1097 702/29 |
| 2003/0054323 | A1 * | 3/2003 | Skaggs | G09B 9/08 434/29 |
| 2003/0101091 | A1 * | 5/2003 | Levin | G06Q 10/06398 705/7.42 |
| 2003/0105616 | A1 * | 6/2003 | Chang | G06Q 10/06 703/13 |
| 2003/0105656 | A1 * | 6/2003 | Thengvall | G06Q 10/04 705/7.21 |
| 2004/0248071 | A1 * | 12/2004 | Bedziouk | A63B 24/00 434/247 |
| 2006/0177803 | A1 * | 8/2006 | Pennington | G09B 5/00 434/219 |
| 2006/0233346 | A1 * | 10/2006 | McIlwaine | H04M 3/5175 379/265.02 |
| 2007/0203711 | A1 * | 8/2007 | Nation | G09B 7/00 434/350 |
| 2008/0070218 | A1 * | 3/2008 | Ahl | G09B 5/00 434/322 |
| 2008/0291032 | A1 * | 11/2008 | Prokhorov | B64D 11/0015 340/576 |
| 2010/0092926 | A1 * | 4/2010 | Fabling | G09B 9/08 434/30 |
| 2010/0105017 | A1 * | 4/2010 | Herden | G09B 7/04 434/262 |
| 2010/0174424 | A1 * | 7/2010 | Cornell | G05B 23/0272 701/14 |
| 2011/0097698 | A1 * | 4/2011 | Henderson | G09B 7/04 434/362 |
| 2012/0075122 | A1 * | 3/2012 | Whitlow | B64D 45/0056 340/963 |
| 2012/0144762 | A1 * | 6/2012 | Eatock | G09B 19/00 52/79.5 |
| 2013/0130217 | A1 * | 5/2013 | Dohring | G09B 5/06 434/350 |
| 2013/0142322 | A1 * | 6/2013 | Grasso | G06Q 10/06398 379/265.06 |
| 2015/0339620 | A1 * | 11/2015 | Esposito | G06Q 10/1093 705/7.16 |
| 2016/0019808 | A1 * | 1/2016 | Chavez | G09B 9/302 434/38 |
| 2016/0171423 | A1 * | 6/2016 | El-Shishiny | G06Q 50/2057 705/7.17 |
| 2017/0039879 | A1 * | 2/2017 | Dasgupta | G09B 19/00 |
| 2017/0116551 | A1 * | 4/2017 | Kubo | G06Q 10/06311 |
| 2018/0025309 | A1 * | 1/2018 | Absher | G06Q 10/063112 705/7.14 |
| 2018/0091651 | A1 * | 3/2018 | Slovacek | H04M 3/5175 |
| 2018/0096309 | A1 * | 4/2018 | Moses | G06F 16/24 |
| 2018/0101806 | A1 * | 4/2018 | Adepoju | G06Q 10/06398 |
| 2019/0244537 | A1 * | 8/2019 | Liberatore | G09B 9/307 |
| 2022/0051585 | A1 * | 2/2022 | Robinson | G02B 27/0172 |

OTHER PUBLICATIONS

Kearns, Suzanne, e-Learning in Aviation ICAO Trainar Plus Global Symposium, Sep. 2012 (Year: 2012).*

E-learning in the Aviation Industry Webanywhere, Jul. 2012 (Year: 2012).*

Chuang, Chi-Kuo et al., Application of E-Learning to Pilot Training at TransAsia Airways in Taiwan International Journal on E-Learning, vol. 7, No. 1, 2008 (Year: 2008).*

European Patent Office; Extended European Search Report for Application No. 20382127.7 dated May 7, 2020.

* cited by examiner

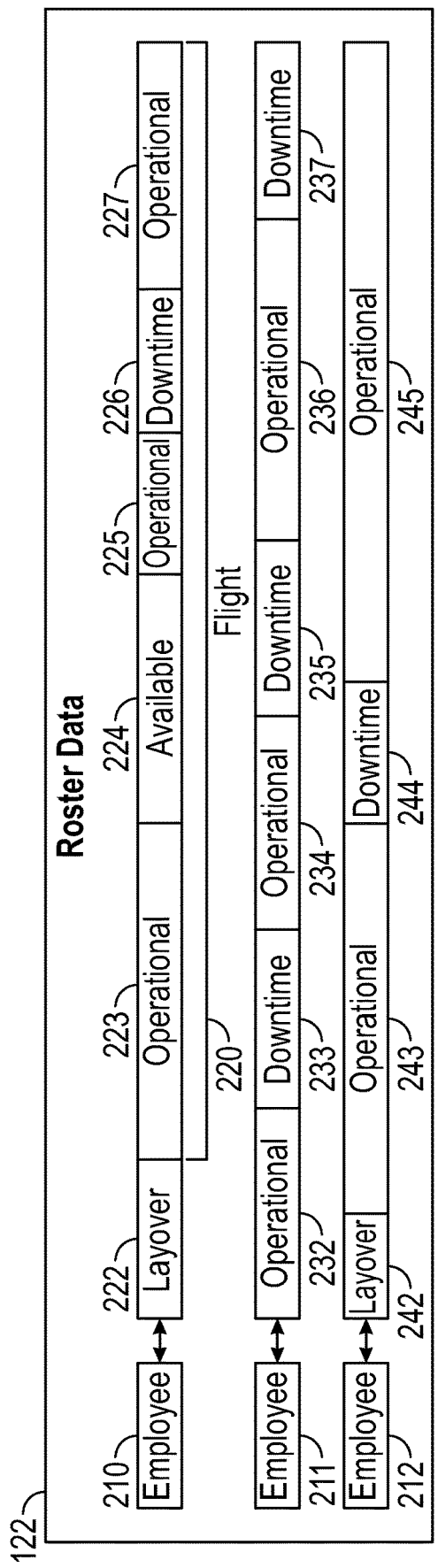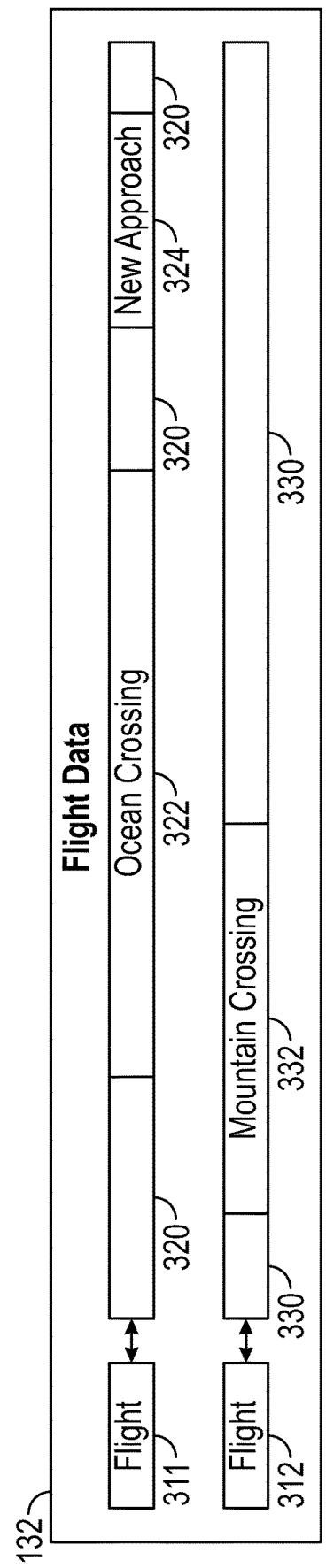
FIG. 2
FIG. 3

US 11,580,872 B2

EMBEDDED TRAINING FOR COMMERCIAL AVIATION

FIELD OF THE DISCLOSURE

This disclosure is generally related to the field of embedded training systems, and in particular, embedded training for commercial aviation.

BACKGROUND

Recent technology has provided new ways to illustrate or simulate training scenarios, facilitating new training methods, improving training quality and effectiveness, and ultimately reducing training costs. These advancements enable training material to be delivered online to trainees, such as pilots, and reduce the amount of time required in conventional training programs, especially for recurrent training needs such as ground-school training programs.

Existing approaches to recurrent flight crew training and evaluation may include computer-based training (CBT) (usually in the form of digital slide presentations), aircraft part-task simulators, aircraft fixed-base simulators, and highly sophisticated and realistic full-motion flight simulators.

CBT is effectively a medium for presenting manuals, checklists, and other paper-based information in a digital slide pack. It typically includes no simulation that would allow someone to interact with the aircraft systems. Training may be enhanced with part-task trainers that enable subjects to practice skills in the operation of specific flight deck systems, however, these part-task trainers fail to provide a full picture of how the aircraft functions in given scenarios and cannot realistically simulate interactions between highly coupled aircraft systems. Fixed-base and full-motion simulators are a good medium for practicing physical maneuvers. However, they cannot evaluate whether the flight crew possess the requisite competencies to manage unusual/non-normal situations. They also cannot predict whether the flight crew understands the underlying mechanics of how the aircraft functions. Such understanding is crucial for correct decision making to occur.

Further, in order to attend recurrent training ground school (RTGS), pilots are typically taken off flying duties to attend classes and simulator training for several days each year. For an airline with more than 4,200 pilots, for example, this training may cost upwards of $50 million each year.

SUMMARY

In an embodiment, a method includes retrieving roster data from a roster database. The method further includes determining from the roster data whether an employee has a period of downtime. The method also includes selecting a training exercise applicable to the employee. The method includes sending a notification to an electronic device associated with the employee, where the notification includes an offer to perform the training exercise.

In some embodiments, the period of downtime includes scheduled available time during a flight, a scheduled downtime during a flight, or a layover time before a flight. In some embodiments, selecting the training exercise applicable to the employee includes retrieving flight data from a flight database, where the flight data corresponds to a flight associated with the employee, determining a training concept associated with the flight, and selecting the training exercise from multiple training exercises, where the training exercise is associated with the training concept. In some embodiments, selecting the training exercise applicable to the employee includes retrieving regulator data or audit data from a regulator or audit database, where the regulator data or audit data indicates the training exercise.

In some embodiments, selecting the training exercise applicable to the employee includes retrieving sample data associated with multiple employees, and determining a common training exercise associated with the multiple employees, where the training exercise is the common training exercise. In some embodiments, determining a common training exercise associated with multiple employees includes performing an artificial intelligence analysis of a training history associated with the multiple employees.

In some embodiments, the selected training exercise includes a mid-fidelity simulation. In some embodiments, the employee is a pilot, an aircraft engineer, a ground operation crew member, or a cabin crew member. In some embodiments, the method includes providing feedback regarding the training exercise to the learning management system.

In an embodiment, a learning management system includes a network module configured to retrieve roster data from a roster database, where the roster data indicates whether an employee has a period of downtime. The system further includes memory storing multiple training exercises. The system also includes a processor configured to determine whether an employee has a period of downtime based on the roster data, select a training exercise from the multiple training exercises, and send a notification to an electronic device associate with the employee, where the notification includes an offer to perform the training exercise.

In some embodiments, the period of downtime includes scheduled available time during a flight, a scheduled downtime during a flight, or a layover time before a flight. In some embodiments, the processor is further configured to retrieve flight data for a flight associated with the employee and determine a training concept associated with the flight, where the training exercise is associated with the training concept. In some embodiments, the processor is further configured to retrieve regulator data or audit data, where the regulator data or audit data indicates relevant training exercises. In some embodiments, the processor is further configured to retrieve sample data associated with multiple employees and determine a common training exercise associated with the multiple employees, where the training exercise is the common training exercise.

In some embodiments, the system includes an artificial intelligence module configured to perform an artificial intelligence analysis of a training history associated with multiple employees and to determine the common training exercise associated with the multiple employees based on results of the artificial intelligence analysis. In some embodiments, the selected training exercise includes a mid-fidelity simulation. In some embodiments, the employee is a pilot, an aircraft engineer, or a cabin crewperson. In some embodiments, the processor is further configured to receive feedback regarding the training exercise.

In an embodiment, a system includes a processor and memory, where the memory stores instruction that, when executed by the processor, cause the processor to retrieve roster data from a roster database. The instructions further cause the processor to determine from the roster data whether a pilot has a scheduled downtime during a flight or a layover time before the flight. The instructions further cause the processor to retrieve flight data associated with the flight from the learning management system. The instructions further cause the processor to determine a training concept associated with the flight. The instructions further cause the processor to select a training exercise from multiple training exercises, where the training exercise is associated with the training concept. The instructions cause the processor to send a notification to an electronic device associated with the pilot, wherein the notification includes an offer to perform the training exercise. In some embodiments, the instructions further cause the processor to receive feedback regarding the training exercise from the electronic device.

BRIEF DESCRIPTION OF THE DRAWINGS

FIG. 2 depicts an embodiment of roster data.
FIG. 3 depicts an embodiment of flight data.

Figure 1:
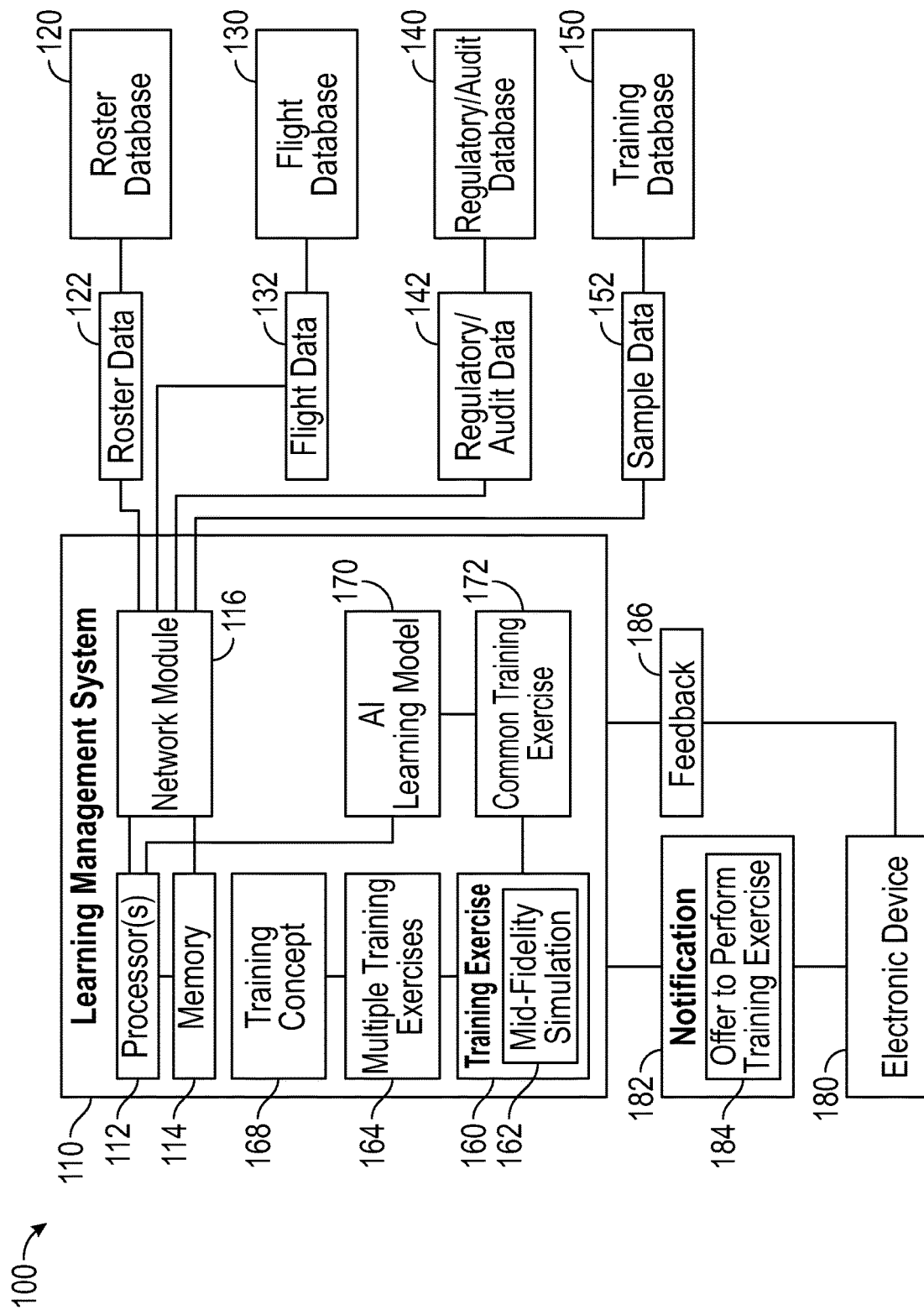
FIG. 1 is a block diagram depicting an embodiment of a system for embedded training.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents, and alternatives falling within the scope of the disclosure.

DETAILED DESCRIPTION

The described systems and methods may enable training in an operational setting when there is time available that cannot be used effectively for other purposes. While the embodiments described herein are associated with aviation, the disclosed systems may be applied in many fields, such as armed forces, police, and/or any field for which operations may include long periods of waiting or preparation that may be difficult to use effectively.

The training described herein may be provided via training modules. In some embodiments, the training modules may include mid-fidelity simulation modules that may provide instruction regarding scenarios that are applicable to a wide range of aircraft and situations. An example of a system for mid-fidelity training is described in U.S. patent application Ser. No. 16/275,723, filed on Feb. 14, 2019 and entitled "Mid-Fidelity Simulation Approach and Method for Flight Crew Training and Evaluation," the contents of which are incorporated by reference herein in their entirety. Mid-Fidelity Simulation may increase the effectiveness of the training and make it more engaging and interactive. Further, mid-fidelity simulations may provide short, concentrated, and effective training intervals that can be taken with limited time.

Embedded training modules could be aimed for long-cruise segments in areas with minimal other traffic. Taking such training modules in flight would be an option available for pilots. They could also take them as preparation for a flight, or at another time. However, the benefit of taking the modules as preparation or in flight would be that the training material could be linked to a particular flight and would thus correspond with an operational need for the knowledge and skills provided by a linked module. This link between relevant knowledge and an operational situation would contribute to higher situation awareness for pilots.

Some examples of training modules that could be available, and may be adapted to long-haul flights, include: a simulated Himalaya crossing during a Dubai to Beijing flight, or a drift-down procedures module during the same flight; a North Atlantic Tracks (NAT) refresher training for flights across the Atlantic Ocean; a refresher training on volcanic ash and related procedures for routes over areas with risk for volcanic activity; and polar operations for polar routes.

The modules could be part of an overall learning management system that tracks pilots' training and examinations for regulatory and audit purposes. When linked to a rostering system, suggestions to pilots could be sent out before a flight and reminders provided for the flight. As an example, this system could remind a pilot that he has not done an Atlantic crossing in the last few months and offer the module as a refresher before or in flight. The system could then provide different levels of recommendations, based on regulatory requirements. For example, the system could generate a notification with various recommendations, such as "You need to complete this module by [a particular date]—do you want to do it now?" or "This flight will pass over active volcanic areas—do you want more information on this?" or "You have not passed over the Himalayas recently—do you want to have an update on this?" or "Many pilots have recently looked at the module on new approach procedures for Hong Kong—would you like to take this module?"

In parallel with the previous examples, it may be desirable to have, for example, a drift-down simulation scenario for flights over the Himalayas, a volcanic ash scenario for flights passing over volcanic areas, a diversion scenario for flights over polar areas, and a loss of communication scenario for flights at risk for communication loss. All of these can have a briefing and debriefing portion. The simulations may be more effective in keeping the recipient's attention by providing information that is relevant to a current or impending flight. Further, the recipient will be ready to apply the training if a situation like the one in the scenario occurs. Human factors research related to management of unexpected events has shown that crews that prepare for any unexpected scenario perform better when such a scenario occurs, even if it is not the specific scenario they prepared for. In this way the training modules can enhance situation awareness and prepare pilots for unexpected events in the same way that pilots have long done by playing the "what if" game and talking to each other about possible in-flight risks and scenarios.

Many airlines may have guidelines restricting reading distracting material (newspapers, books, etc.) and using distracting equipment (phones, tablets, etc.) during flights, while encouraging reading operationally relevant material (charts, manuals, etc.). The disclosed systems and methods may provide engaging, useful, and operationally relevant interactions on the flight deck. Given the sensitivities around providing training (and potential distraction), one, or a few modules, with clear operational relevance to a flight could be offered initially. These could be deployed on a voluntary basis. Tracking of when the modules are taken can be used to identify patterns of usage and adapt the modules and system to fit the needs of the pilots. Over time, an increasing number of modules can be introduced.

These embedded training systems may also be used for engineers, cabin crew, and other professional groups in aviation who have periods of waiting or other inactivity as part of their work. In every case such training may be designed to not be distractive and to not interfere with the primary aspects of the duty.

Referring to FIG. 1, an embodiment of a system 100 for embedded training is depicted. The system 100 may include a learning management system 110, several databases such as a roster database 120, a flight database 130, a regulatory or audit database 140, and a training database 150, and an electronic device 180 such as a tablet device or a personal computing device. Although the embodiment shown in FIG. 1 depicts each of the databases 120-150 as distinct from and independent of the learning management system 110, in other embodiments, one or more of the databases 120-150 may be combined with the learning management system 110. In still other embodiments, one or more of the databases 120-150 may be implemented as a separate system remotely located from the learning management system 110.

The learning management system 110 may include one or more processors 112, memory 114, and a network module 116. The one or more processors 112 may include a central processing unit (CPU), a graphical processing unit (GPU), a digital signal processor (DSP), a peripheral interface controller (PIC), another type of microprocessor, and/or combinations thereof. Further, the one or more processors 112 may be implemented as integrated circuits, field-programmable gate arrays (FPGAs), application-specific integrated circuit (ASICs), combinations of logic gate circuitry, other types of digital or analog electrical design components, or combinations thereof. The memory 114 may include memory devices such as random-access memory (RAM), read-only memory (ROM), magnetic disk memory, optical disk memory, flash memory, another type of memory capable of storing data and processor instructions, or the like, or combinations thereof.

The network module 116 may include a network interface controller and may be configured for wired or wireless communication. The network module 116 may communicate with the databases 120-150 via a private or public wide area network (WAN), such as the internet, or via a local area network (LAN). Further, the network module 116 may include any devices sufficient to enable the processor 112 to receive and process data from the databases 120-150.

The learning management system 110 may further include an artificial intelligence (AI) learning model 170. The AI learning model 170 may be usable to select a training exercise 160 from multiple training exercises 164 based on a training concept 168 as described herein. The AI learning model 170 may implement artificial intelligence algorithms such as ant colony optimization, genetic algorithms, evolutionary algorithms, learning classifier systems, self-organizing maps, other types of machine learning classification techniques, or an ensemble model. It may be implemented as neural networks, decision trees, nonlinear regression, logistic regression, other types of machine learning classification models, or combinations thereof.

During operation, the learning management system 110 may retrieve roster data 122 from the roster database 120. The roster data 122 may be analyzed to determine whether an employee has a period of downtime. The period of downtime may include scheduled available time during a flight, a scheduled downtime during a flight, a layover time before a flight, or anytime that it is apparent the employee may be available to perform a training exercise. The employee may be a pilot, an aircraft engineer, a ground operation crew member, a cabin crew member, another type of worker in the aviation field, or the like.

The learning management system 110 may select a training exercise 160 that is applicable to the employee. As an illustrative example, the learning management system 110 may retrieve flight data 132 from the flight database 130 for a flight associated with the employee and determine the training concept 168 associated with the flight. The learning management system 110 may select a training exercise 160 that is associated with the training concept 168 from the multiple training exercises 164.

In order to determine which training exercises may be applicable to an employee, the learning management system 110 may retrieve regulatory or audit data 142 from the regulatory or audit database 140. The regulatory or audit data 142 may indicate training exercises or concepts that are required for the employee and have not yet been performed. Based on the regulatory data or audit data 142, the training exercise 160 may be selected.

Selecting the training exercise applicable to the employee may alternatively or additionally include retrieving sample data 152 associated with multiple employees and determining a common training exercise 172 associated with the multiple employees. The training exercise 160 may be the common training exercise 172. Determining the common training exercise 172 associated with multiple employees may include performing an artificial intelligence analysis of a training history associated with the multiple employees using the AI learning model 170.

Once the training exercise 160 has been selected, the learning management system 110 may send a notification 182 to an electronic device 180 associated with the employee. The notification 182 may include an offer 184 to perform the training exercise. The employee may then have an opportunity to accept or reject the training exercise 160. If the employee rejects the training exercise 160, it may be scheduled for another time.

The system 100 may be used in conjunction with a mid-fidelity simulator. For example, the training exercise 160 may include a mid-fidelity simulation 162. The mid-fidelity simulation 162 may provide simulations and scenarios that are common among multiple aircraft. This may enable the employee to receive conceptual scenario training as opposed to aircraft-specific training.

In order to ensure that training is relevant and productive, the learning management system 110 may receive feedback 186. This may be provided as user response data retrieved during performance of the training exercise 160, as survey data after performance of the training exercise 160, as instructor review data, or another form of evaluation data. The feedback 186 may be used to modify the training exercise 160 and/or the AI learning model 170.

Using the system 100, embedded training could be tracked, similar to other recurrent training, as part of a broad learning management plan. A benefit of the system 100 is that short periods of time available in operations, in flight or on the ground, may be used for training, and the training may be more closely linked to current operations. Another benefit for pilots would be a lower recurrent training load to handle on their own time. For both pilots and airlines, the provision of operationally relevant information at relevant times may increase situation awareness and decrease operational risk.

The embedded training component may also rely on artificial-intelligence-driven systems that may track, propose, and recommend training based on operational risk and training evidence. Although regulatory requirements will remain necessary to fulfill, the road to do so can be traced along actual operational knowledge needs as determined through artificial intelligence. With the embedded training available through the system 100, regulatory training needs can be met when they are operationally relevant. For example, a ten-minute refresher module on hydraulic systems is probably more relevant when a pilot is sitting on the flight deck with the system in front of them. Other advantages may exist.

Referring to FIG. 2, an embodiment of the roster data 122 is depicted. The roster data 122 may associate, or otherwise map, employees to schedules. To illustrate, a first employee 210 may be associated with various scheduled events such as a layover 222, operational times 223, 225, 227, available time 224, and a downtime 226. For example, the first employee 210 may be a pilot and the operational times 223, 225, 227, the available time 224, and the downtime 226 may be associated with a flight 220. A first operational time 223 may be associated with a takeoff, a second operational time 225 may be associated with an in-flight piloting activity, such as a course change, etc., a third operational time 227 may be associated with a landing. During long-haul flights, there may be available time 224 where, when permitted by flight regulations, a pilot may have some free time available for training. Other times, a pilot may have scheduled downtime 226 during the flight 220 and may perform training then.

A second employee 211 may be associated with additional scheduled events such as operational times 232, 234, 236 and downtimes 233, 235, 237. For example, the second employee 211 may be a ground crew member. The operational times 232, 234, 236 may be associated with duties to perform during landing, taxi, and gate operations. The downtimes 233, 235, 237 may be interspersed between flights when the ground crew member's workload may be lighter. The downtimes 233, 235, 237 may be available for the employee 211 to perform a training exercise.

A third employee 212 may be associated with scheduled events such as a layover 242, operational times 243, 245, and a downtime 244. For example, the third employee may be a flight crew member. The operational times 243, 245 may correspond to times when the flight crew member is attending to in-flight duties, while the layover 141 and the downtime 244 may be times when the flight crew member is available to perform a training exercise.

Although the roster data 122 is depicted as only including three employees, in practice, the roster data may include entries for many employees including multiple pilots, ground crews, flight crews, and other personnel associated with commercial flight. Further, although the example depicted in FIG. 2 relates to commercial flight, other examples exist in fields other than commercial flight.

The roster data 122 may be used by the learning management system 110 of FIG. 1 to determine whether one or more of the employees 210-212 has a period of downtime. The notification 182 of FIG. 1 may then be timed to give the employees 210-212 an opportunity to perform the training exercise 160 of FIG. 1 during the period of downtime.

Referring to FIG. 3, an embodiment of the flight data 132 is depicted. The flight data 132 may associate, or otherwise map, flights 311, 312, with timelines 320, 330. For example, a first flight 311 may be mapped to a timeline 320 that includes aviation events such as an ocean crossing 322 and a new approach 324 to an airport. A second flight 312 may be mapped to a timeline 330 that includes aviation events such as a mountain crossing 332. The aviation events may be the basis for training concepts (e.g., the training concept 168 of FIG. 1). The learning management system 110 of FIG. 1 may use the flight data 132 to determine the training concept 168 and to select the training exercise 160 from the multiple training exercises 164. It should be noted that the ocean crossing 322, the new approach 324, and the mountain crossing 332 are only some examples of many different types of aviation events that may be associated with flights. Other potential scenarios may include fuel contaminations, ash encounters, technical problems, diversions due to sick passengers, etc. In practice, any type of aviation event may be associated with a flight and/or scheduled for training. The disclosure is not intended to be limited to the examples provided herein.

Figure 4:
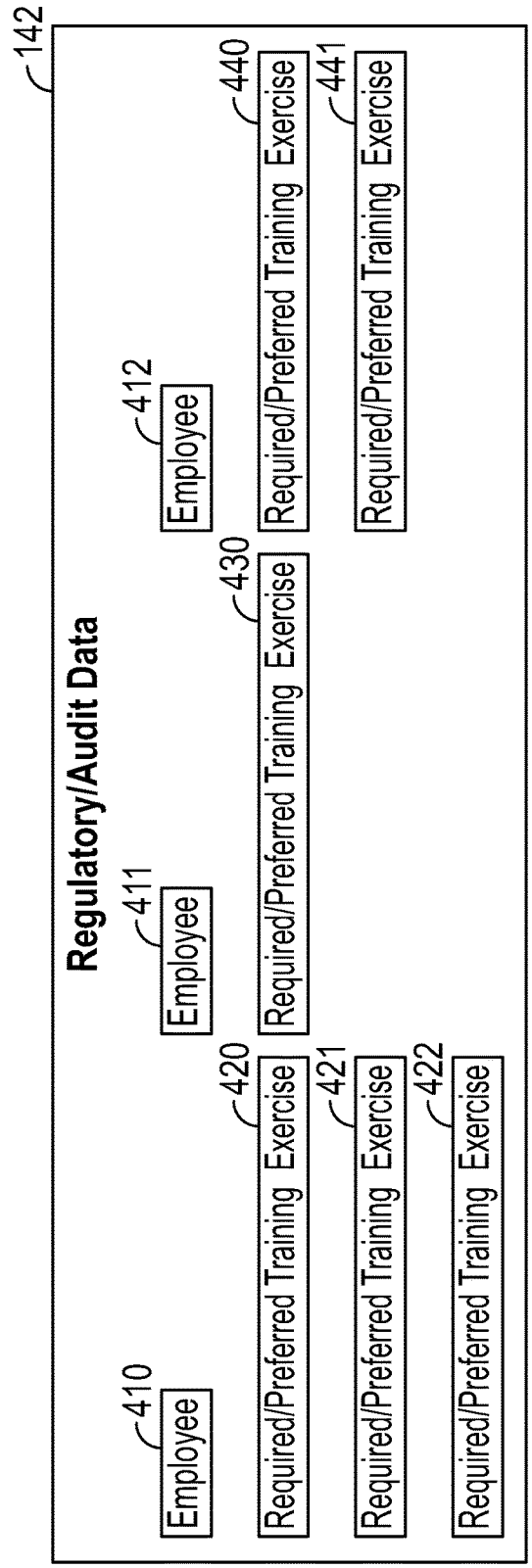
FIG. 4 depicts an embodiment of regulatory or audit data.

Referring to FIG. 4, an embodiment of the regulatory or audit data 142 is depicted. The regulatory or audit data 142 may map employees 410-412 to various required or preferred training exercises 420-422, 430, 440, 441. For example, a first employee 410 may be mapped to a first set of required or preferred training exercises 410-422, a second employee may be mapped to a second required or preferred training exercise 430, and a third employee 412 may be mapped to a third set of required or preferred training exercises 440, 441.

Regulatory authorities (such as the Federal Aviation Administration) may require that the employees 410-412 receive certain training and may perform audits to ensure that it has been done. Likewise, individual airlines or air service providers may require certain training. As the employees 410-412 complete the training, it may be removed from their list of required or preferred training exercises. The learning management system 110 of FIG. 1 may select the training exercise 160 to correspond to the regulatory or audit data 142 for the employees 410-412.

Figure 5:
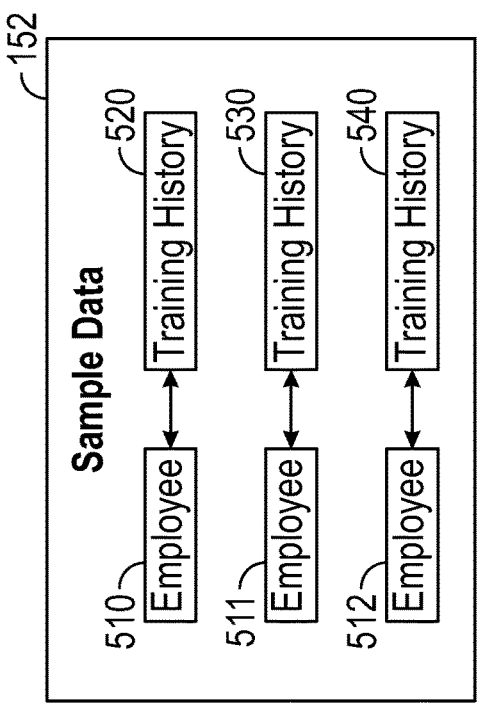
FIG. 5 depicts an embodiment of sample data.

Referring to FIG. 5, an embodiment of the sample data 152 is depicted. The sample data 152 may map employees 510-512 to training histories 520, 530, 540. For example, a first employee 510 may be mapped to a first training history 520, a second employee 511 may be mapped to a second training history 530, and a third employee 512 may be mapped to a third training history 540. The learning management system 110 of FIG. 1 may use the sample data 152 to determining a common training exercise 172 associated with the employees 510-512. The training exercise 160 may correspond to and/or may be the common training exercise 172. Determining the common training exercise 172 associated with employees 510-512 may include performing an artificial intelligence analysis of the training histories 520, 530, 540.

Figure 6:
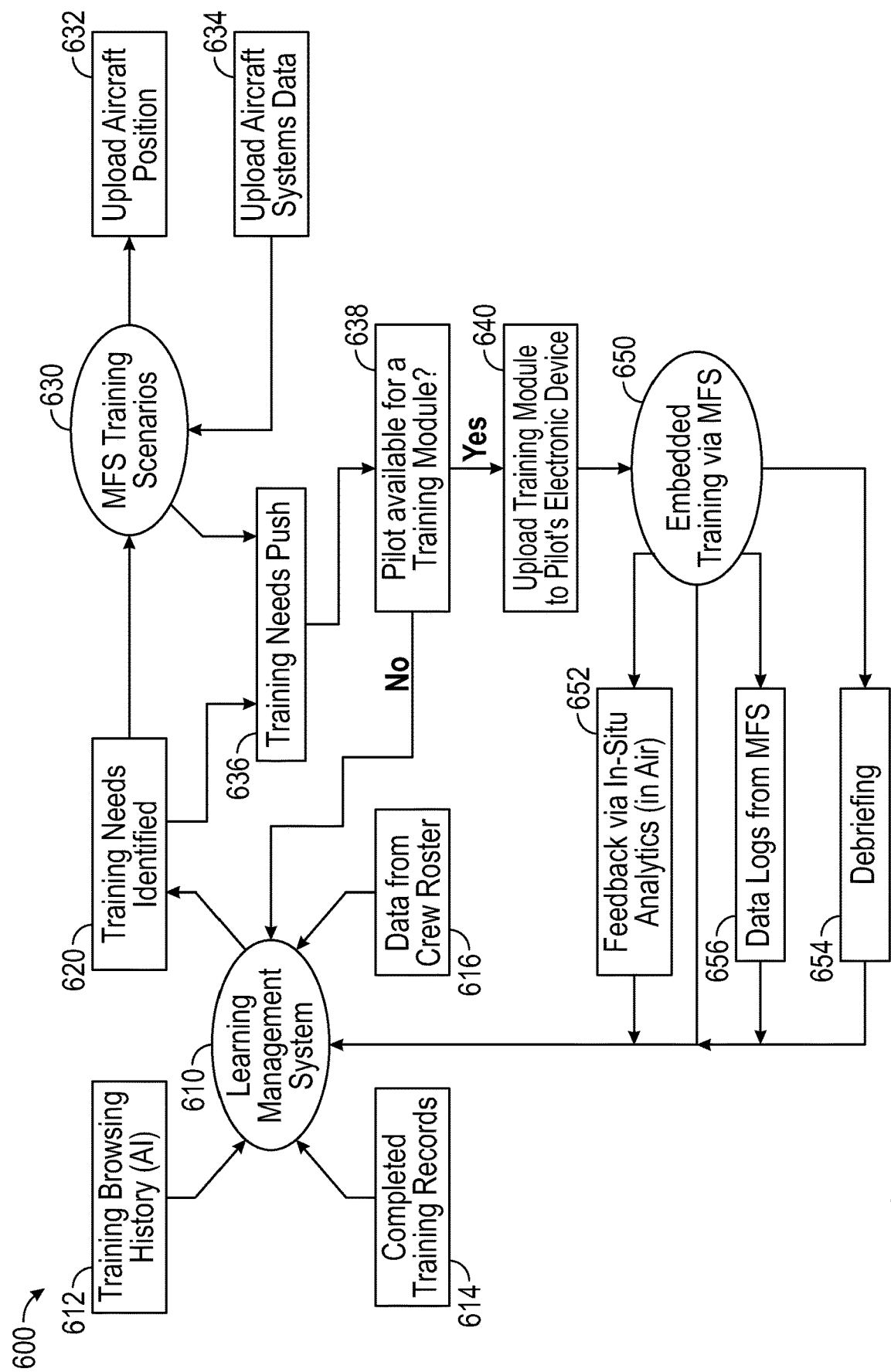
FIG. 6 is a conceptual diagram depicting an embodiment of embedded training for commercial aviation is depicted.

Referring to FIG. 6, a conceptual diagram 600 depicting an embodiment of embedded training for commercial aviation is depicted. As shown in the diagram 600, a learning management system 610 and mid-fidelity simulation (MFS) training scenarios 630 may be used to provide embedded training 650 via mid-fidelity simulation. The learning management system 610 may receive a training browsing history 612, completed training records 614, and data from a crew roster 616. The training browsing history 612 may be associated with multiple trainees and can help the learning management system 610 identify common training topics and scenarios where training might be beneficial. The completed training records 614 may function as a checklist to indicate what training trainees have completed and what training still needs to be completed. The data from the crew roster 616 may enable the learning management system 610 to identify time periods when trainees may be available for training and to identify training scenarios that may be relevant to the trainee's scheduled flights. The learning management system 610 may correspond to the learning management system 110 of FIG. 1 and may rely on artificial intelligence to identify training needs, at 620.

Once training needs have been identified, at 620, the mid-fidelity simulation training scenarios 630 may be selected and calibrated. For example, the mid-fidelity simulation training scenarios 630 may upload actual data relevant to a trainee. To illustrate, during a flight associated with the trainee, the mid-fidelity simulation training scenario 630 may upload an aircraft position, at 632, and/or upload aircraft systems data, at 634. An example of using uploaded flight data in mid-fidelity simulation is further described in U.S. patent application Ser. No. 16/275,723, filed on Feb. 14, 2019 and entitled "Mid-Fidelity Simulation Approach and Method for Flight Crew Training and Evaluation," which has been incorporated by reference herein.

The training needs of a trainee may then be pushed to a device associated with the trainee, at 636. For example, the notification 182 of FIG. 1 may be sent to the electronic device 180 associated with the trainee. Afterwards, the electronic device may query the trainee, who in the depicted embodiment may be a pilot, to determine whether the trainee is available for a training module, at 638. If the trainee indicates that they are not available, that information may be provided to the learning management system 610 for use in determine what training to provide and when to provide it.

If the trainee is available for a training module, the training module may be uploaded to the trainee's electronic device, at 640. In the depicted embodiment, the electronic device may be an iPad, or a similar portable electronic device, such as an electronic flight book. The trainee may then perform the embedded training 650.

During the embedded training 650, data logs 656 may be generated. Further, after the training, feedback 652 via in-situ analytics may be performed to evaluate the trainee's performance and the relevance of the mid-fidelity simulation training scenarios 630. Also, the trainee may engage in a debriefing 654 with an instructor, with an automated feedback application, or with another type of feedback collection method. Data and results associated with the data logs 656, the feedback 652, and the debriefing 654 may be provided to the learning management system 610 for future use in determine what training to provide and when to provide it. For example, training data from the use of MFS, which may be included in the data logs 656, can be used to determines a next exercise to be performed. If a trainee does well, they may not need further training in a particular area. Otherwise, the data logs 656 can be used by the learning management system 610 to determine whether to offer another training, or additional training, within a certain time frame.

Figure 7:
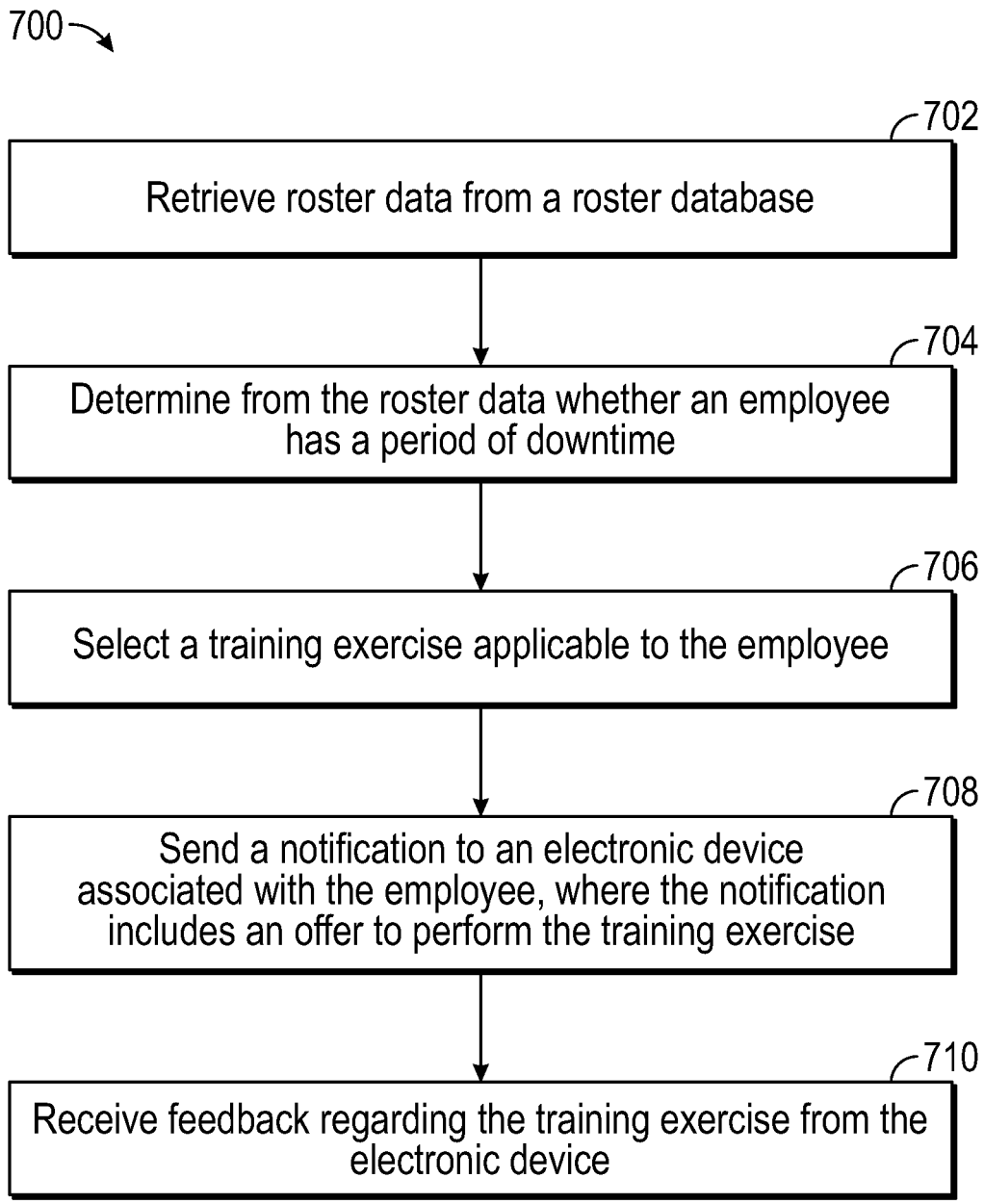
FIG. 7 is a flow diagram depicting an embodiment of a method for embedded training.

Referring to FIG. 7, an embodiment of a method 700 for embedded training is depicted. The method 700 may include retrieving roster data from a roster database, at 702. For example, the learning management system 110 may retrieve the roster data 122 from the roster database 120.

The method 700 may further include determining from the roster data whether an employee has a period of downtime, at 704. For example, the learning management system 110 may determine whether one or more of the employees 210-212 has a period of downtime, such as the available time 224, or the downtimes 226, 233, 235, 237, 244.

The method 700 may also include selecting a training exercise applicable to the employee, at 706. For example, the learning management system 110 may select the training exercise 160 when the training exercise 160 is applicable, as determined based on the flight data 132, the regulatory or audit data 142, and/or the sample data 152.

The method 700 may include sending a notification to an electronic device associated with the employee, where the notification includes an offer to perform the training exercise, at 708. For example, the learning management system 110 may send the notification 182 to the electronic device 180.

The method 700 may further include receiving feedback regarding the training exercise from the electronic device, at 710. For example, the learning management system 110 may receive the feedback 186.

A benefit of the method 700 is that embedded training may be provided to employees during time periods where they may be available to take such training and the provided training may be situationally applicable to the employee's upcoming scheduled tasks. Other benefits may exist.

Although various embodiments have been shown and described, the present disclosure is not so limited and will be understood to include all such modifications and variations as would be apparent to one skilled in the art.

What is claimed is:

1. A method comprising:

retrieving, by a first electronic device, roster data from a roster database over a network, wherein the roster data maps flight crew members to scheduled events related to one or more flight;

determining, at the first electronic device, from the roster data whether a flight crew member has a scheduled period of downtime including a scheduled available time during a flight, a layover time before the flight, or another time that the flight crew member is available for training;

retrieving, by the first electronic device, flight data associated with the flight from a flight database over the network, wherein the flight data maps the flight to a timeline that includes aviation events related to the flight;

determining, at the first electronic device, a training concept associated with the flight based on the aviation events;

retrieving, by the first electronic device, regulatory data over the network, wherein the regulatory data maps the flight crew member to a set of training exercises;

selecting, at the first electronic device, a training exercise based on a determination by an artificial intelligence learning model that the training exercise satisfies at least one of the set of training exercises and provides knowledge and skills that relate to at least one of the aviation events associated with the training concept associated with the flight; and sending a notification, from the first electronic device to a second electronic device associated with the flight crew member, wherein, in response to the notification, the second electronic device is configured to generate a query to the flight crew member and receive electronic input from the flight crew member to determine whether the flight crew member is available for the training exercise;

in response to an indication that the flight crew member is available for the training exercise, uploading the training exercise, from the first electronic device to the second electronic device after performance of the training exercise, receiving, at the first electronic device, feedback from the flight crew member providing an indicator of relevance of the training exercise to the knowledge and skills that relate to the at least one of the aviation events; and modifying, at the first electronic device, the artificial intelligence learning model based on the feedback.

2. The method of claim 1, wherein the scheduled period of downtime includes a period during a long-haul flight when training is permitted by flight regulations.

3. The method of claim 1, wherein the artificial intelligence learning model is a neural network.

4. The method of claim 1, wherein the regulatory data corresponds to requirements by a regulatory authority or an airline.

5. The method of claim 1, wherein selecting the training exercise further comprises:
retrieving sample data associated with multiple flight crew members, wherein the training exercise is selected based at least in part on the sample data.

6. The method of claim 5, wherein the training exercise is selected based at least in part on a training history associated with the multiple flight crew members.

7. The method of claim 1, wherein the selected training exercise includes a mid-fidelity simulation.

8. The method of claim 1, wherein the flight crew member is a pilot, an aircraft engineer, a ground operation crew member, or a cabin crew member.

9. A learning management system comprising:
a network module configured to:
retrieve roster data from a roster database over a network, wherein the roster data maps flight crew members to scheduled events related to one or more flight;
retrieve flight data associated with the flight from a flight database over the network, wherein the flight data maps the flight to a timeline that includes aviation events related to the flight; and
retrieve regulatory data over the network, wherein the regulatory data maps a flight crew member to a set of training exercises;
memory storing multiple training exercises; and
a processor configured to:
determine from the roster data whether a flight crew member has a scheduled period of downtime including a scheduled available time during a flight, a layover time before the flight, or another time that the flight crew member is available for training;
determining a training concept associated with the flight based on the aviation events;
select a training exercise from the multiple training exercises based on a determination by an artificial intelligence learning model that the training exercise satisfies at least one of the set of training exercises and provides knowledge and skills that relate to at least one of the aviation events associated with the training concept associated with the flight; and
send a notification to an electronic device associate with the flight crew member, wherein the notification includes an offer to perform the training exercise;
in response to an indication that the flight crew member is available for the training exercise, upload the training exercise to the electronic device;
after performance of the training exercise, receive feedback from the flight crew member providing an indicator of relevance of the training exercise to the knowledge and skills that relate to the at least one of the aviation events; and
modify the artificial intelligence learning model based on the feedback.

10. The system of claim 9, wherein the scheduled period of downtime includes a period during a long-haul flight when training is permitted by flight regulations.

11. The system of claim 9, wherein the artificial intelligence learning model is a neural network.

12. The system of claim 9, wherein the regulatory data corresponds to requirements by a regulatory authority or an airline.

13. The system of claim 9, wherein the processor is further configured to retrieve sample data associated with multiple flight crew members, wherein the training exercise is selected based at least in part on the sample data.

14. The system of claim 13, wherein the training exercise is selected based at least in part on a training history associated with the multiple flight crew members.

15. The system of claim 9, wherein the selected training exercise includes a mid-fidelity simulation.

16. The system of claim 9, wherein the flight crew member is a pilot, an aircraft engineer, a ground operations crew member, or a cabin crew member.

17. A system comprising a processor and memory, wherein the memory stores instruction that, when executed by the processor, cause the processor to:
retrieve, at the system, roster data from a roster database over a network, wherein the roster data maps flight crew members to scheduled events related to one or more flight;
determine, at the system, from the roster data whether a flight crew member has a scheduled downtime including a scheduled available time during a flight, a layover time before the flight, or another time that the flight crew member is available for training;
retrieve, at the system, flight data associated with the flight from a flight database over the network, wherein the flight data maps the flight to a timeline that includes aviation events related to the flight;
determine, at the system, a training concept associated with the flight based on the aviation events;
retrieving, by the system, regulatory data over the network, wherein the regulatory data maps the flight crew member to a set of training exercises;
select, at the system, a training exercise based on a determination by an artificial intelligence learning model that the training exercise satisfies at least one of the set of training exercises and provides knowledge and skills that relate to at least one of the aviation events associated with the training concept associate with the flight; and
send a notification to an electronic device associated with the flight crew member, wherein the notification includes an offer to perform the training exercise; and
in response to an indication that the flight crew member is available for the training exercise, upload the training exercise, from the system to the electronic device
after performance of the training exercise, receive, at the system, feedback from the flight crew member providing an indicator of relevance of the training exercise to the knowledge and skills that relate to the at least one of the aviation events; and
modify, at the electronic device, the artificial intelligence learning model based on the feedback.

18. The system of claim 17, wherein the scheduled downtime includes a period during a long-haul flight when training is permitted by flight regulations.

19. The system of claim 17, wherein the artificial intelligence learning model is a neural network.

20. The system of claim 17, wherein the flight crew member is a pilot, an aircraft engineer, a ground operations crew member, or a cabin crew member.

* * * * *